US011598289B1

(12) United States Patent
Jardin et al.

(10) Patent No.: US 11,598,289 B1
(45) Date of Patent: Mar. 7, 2023

(54) PROPELLANT VOLUME AND MIXTURE RATIO CONTROL

(71) Applicant: Blue Origin, LLC, Kent, WA (US)

(72) Inventors: Matthew R. Jardin, Mount Pleasant, SC (US); Thomas S. Koch, Seattle, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

(21) Appl. No.: 17/647,498

(22) Filed: Jan. 10, 2022

(51) Int. Cl.
*F02K 9/56* (2006.01)
*F02K 9/46* (2006.01)
*F02K 9/58* (2006.01)
*F02K 9/60* (2006.01)

(52) U.S. Cl.
CPC ............... *F02K 9/563* (2013.01); *F02K 9/46* (2013.01); *F02K 9/58* (2013.01); *F02K 9/605* (2013.01)

(58) Field of Classification Search
CPC ... F02K 9/46; F02K 9/563; F02K 9/58; F02K 9/605; F02K 9/42; F02K 9/425; F02K 9/44; F02K 9/56
See application file for complete search history.

(56) References Cited

U.S. PATENT DOCUMENTS

| | | | | |
|---|---|---|---|---|
| 3,058,303 A * | 10/1962 | Mulready | ................ | F02K 9/56 60/39.27 |
| 3,073,110 A * | 1/1963 | Dillaway | ................ | F02K 9/56 137/101.25 |
| 4,541,238 A * | 9/1985 | Scheller | ................ | F02K 9/563 60/204 |
| 4,618,931 A | 10/1986 | Miller et al. | | |
| 6,262,680 B1 * | 7/2001 | Muto | ................ | G01S 13/723 342/75 |
| 6,571,624 B1 * | 6/2003 | Grayson | ............... | G01F 23/248 73/290 R |
| 6,631,314 B2 | 10/2003 | Fisher et al. | | |
| 7,477,966 B1 * | 1/2009 | Mango | ................ | B64G 1/401 701/13 |
| 7,913,664 B2 | 3/2011 | Williams et al. | | |
| 8,019,494 B1 * | 9/2011 | Mango | ................ | B64G 1/401 701/13 |
| 10,189,584 B2 * | 1/2019 | Nye | ................ | B64G 1/402 |
| 2016/0319772 A1 | 11/2016 | Le Bouar | | |

* cited by examiner

*Primary Examiner* — William H Rodriguez

(74) *Attorney, Agent, or Firm* — Summit Patents PC

(57) ABSTRACT

Systems and methods for determining bi-propellant volume and adjusting a mixture ratio are discussed herein. A controller can calculate an adjusted mixture ratio and command the rocket engine to implement the adjusted mixture ratio by opening or closing valves of the propellant tanks, which changes the volumetric flow rates of each of the propellants. The adjusted mixture ratio can be calculated by an algorithm based on sensed or calculated data associated with each propellant. The adjusted mixture ratio can be used to evenly deplete the propellants to reduce the amount of each propellant remaining after a mission and to improve propellant use, which allows for an increase in a non-propellant payload.

20 Claims, 5 Drawing Sheets

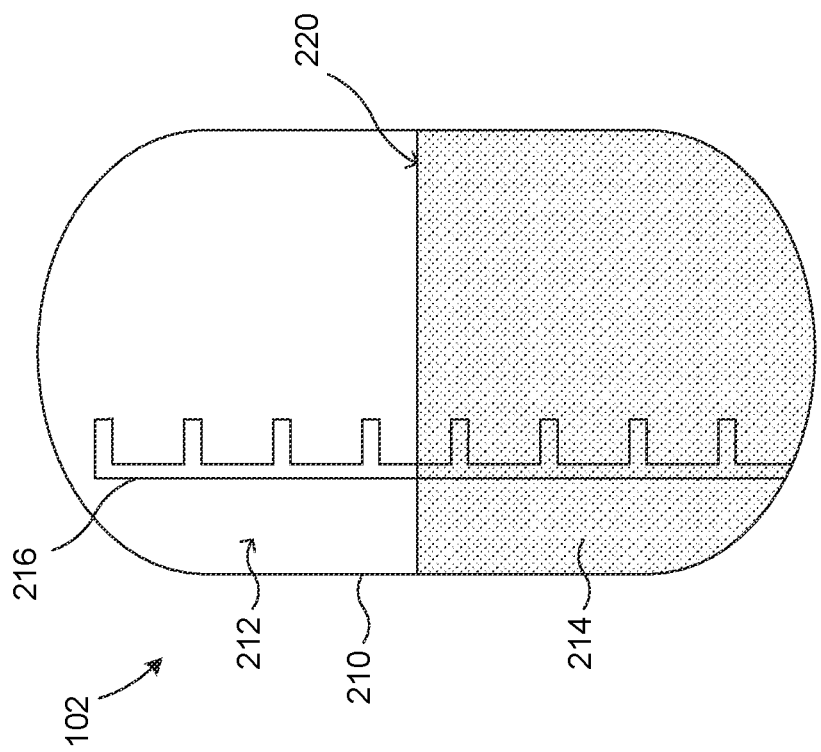
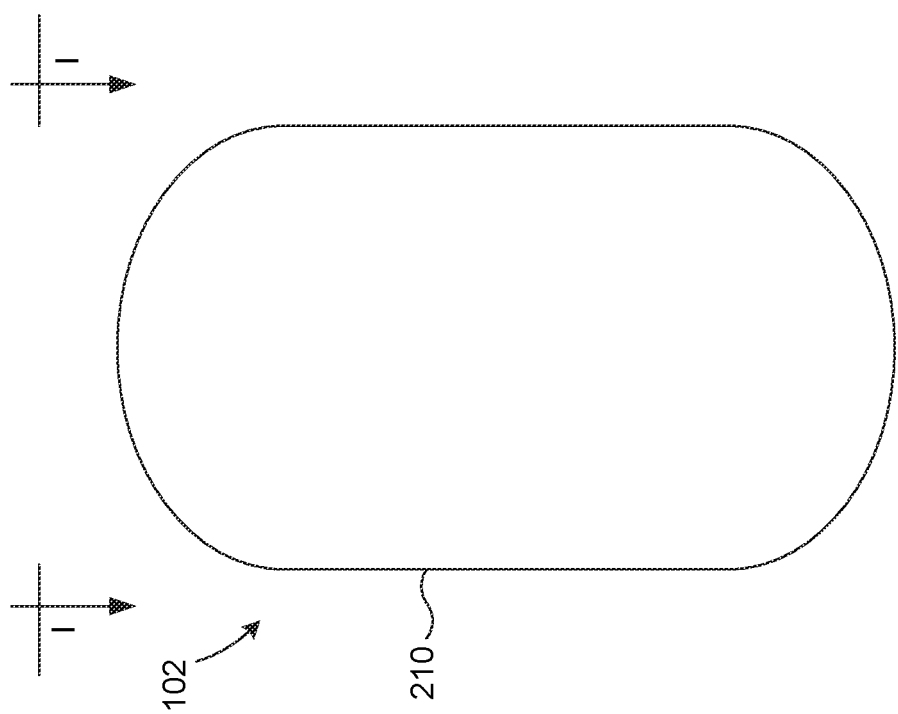

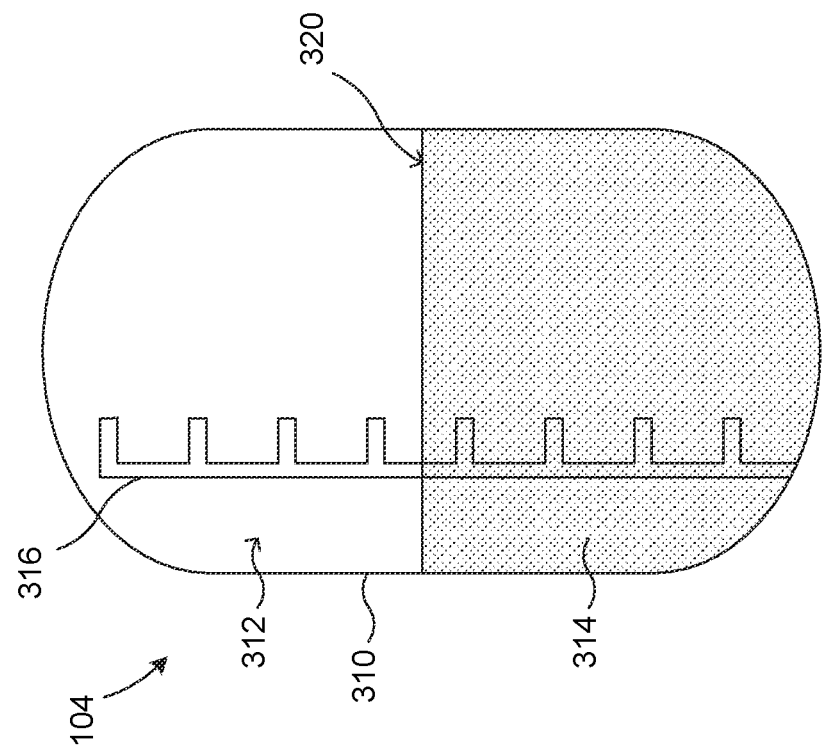
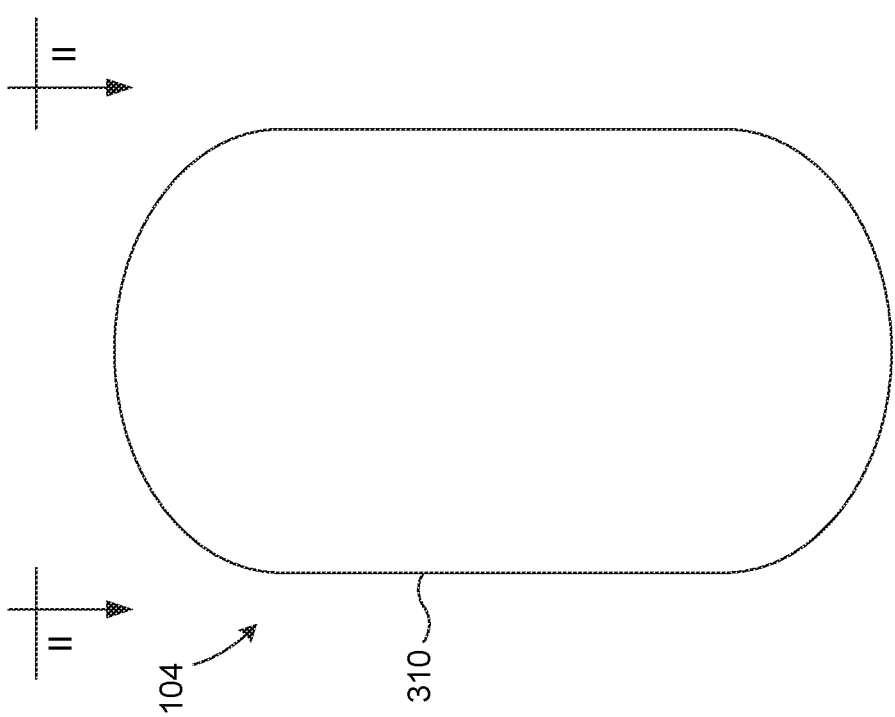

PROPELLANT VOLUME AND MIXTURE RATIO CONTROL

BACKGROUND

Rocket propulsion systems typically use two or more liquid propellants. Conventional propellant control systems measure or estimate the mass of each propellant and calculate the mass flow rate of each of the propellants of the propulsion system to determine the remaining amount of each propellant and the rate of use or depletion of each propellant. To measure or approximate the mass of each of the propellants, a variety of sensors has been used, including capacitance probes, delta-pressure transducers, over-driven resistive thermal detectors (RTD), or other propellant height sensors. The capacitance probes are the closest to true mass sensors, but rely on calibrations that drift over time, so even capacitance probes cannot produce unbiased estimates of mass. The delta-pressure measurements also produce mass estimates, but since density of cryogenic propellants cannot be determined accurately, delta-pressure systems also produce biased mass estimates. The RTD systems directly measure propellant heights, therefore, volume when considered along with an accurately measured tank map. As with the delta-pressure systems, propellant mass can be approximated from propellant height (or volume), but the estimate is biased, because propellant density is not accurately known. Once mass is estimated, engine commands can be adjusted to correct for a mass ratio imbalance between the propellants. The mass ratio imbalance can be corrected to align with a commanded or desired mixture ratio (i.e., the amount of one propellant relative to the amount of the other propellant). Rocket engines require a narrow range of propellant mixture ratios to operate properly, but small adjustments in mixture ratio can be made to cause propellants to be depleted at the same time such that propellant use is maximized.

Each of the conventional systems for measuring or calculating the mass flow rate are prone to bias errors. First, measurement uncertainty can be introduced into the calculations. The sensors can be subject to spikes caused by an instantaneous change in the environment or the system. For example, sloshing can affect an instantaneous mass reading, but does not affect a stable mass reading. The system senses the instantaneous mass and adjusts based on the incorrect instantaneous mass. Further, changes in the number of firing engines throughout a mission can affect mixture ratio bias. Mixture ratio bias may have independent variations from engine to engine. For example, any mixture bias estimated during boost with all engines firing must be reset when switching to fewer engines for a deceleration burn and again when reducing the number of engines for a landing burn.

The art would benefit from a method for producing unbiased propellant volume and mixture ratio controls to reduce the required flight propellant reserve and improve overall launch vehicle performance.

BRIEF DESCRIPTION OF THE DRAWINGS

FIGS. 2A-2B illustrates an example oxidizer tank of the example rocket engine propulsion system.

FIGS. 3A-3B illustrates an example fuel propellant of the example rocket engine propulsion system.

DETAILED DESCRIPTION

Figure 1:
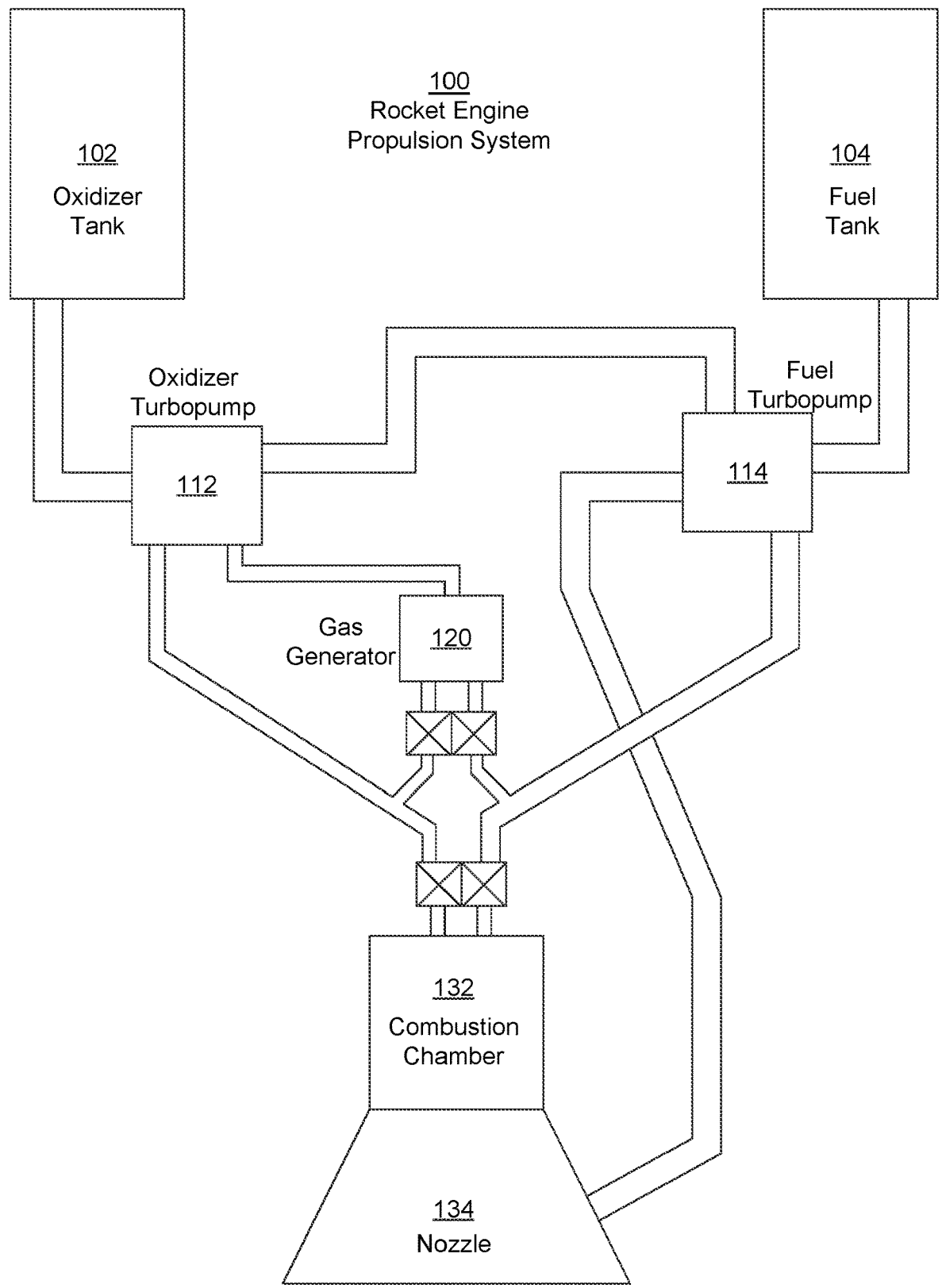
FIG. 1 illustrates an example rocket engine propulsion system.

Systems and methods for determining volumes of multiple liquid propellants and adjusting a mixture ratio of the liquid propellants are discussed herein. The examples discussed herein focus on bi-propellant systems, although the disclosure can be used in systems with any number of multiple propellants. The disclosed systems and methods deplete propellants of a propulsion system of a vehicle, such as a rocket, in a balanced way to maximize propellant utilization. The disclosed systems calculate propellant volumes and biases between commanded and sensed volumetric flow rates, then implement a bias correction and a propellant volume ratio regulation scheme to improve propellant utilization. Specifically, the disclosed systems and methods estimate and correct depletion of propellants in terms of volumetric quantities instead of mass quantities and estimate volumetric flow rate command bias and directly cancel this bias as part of the control scheme. The "volumetric flow rate command bias" is the difference between the commanded and observed volumetric flow rate. The volumetric flow rate is observed by measuring the change of propellant height over time.

Direct measurement of propellant mass is infeasible due to the difficulty in measuring or estimating propellant density. Variations in temperatures and pressures, and the presence of bubbles in the cryogenic fluid cause propellant density to change in a complicated way. By recasting the systems and methods to measure and estimate in terms of one of the propellant volumes eliminates the issue with mass or density variations.

Bi-propellant rocket systems require extra propellant to ensure there is enough of each propellant in case propellants are depleted at an off-nominal ratio. The extra propellant that must be carried is called Flight Propellant Reserve (FPR) and the additional mass of FPR reduces the amount of useful payload that can be carried by the rocket system. This degrades the ability of the rocket system to achieve its main purpose.

Bi-propellants are loaded onto the rocket system in the correct mass ratio such that the rocket engines can consume the propellants at the ideal mixture ratio (MR) for maximum performance. The bi-propellants can be proportionally depleted (i.e., depleted in a ratio which matches MR) so that the bi-propellants are concurrently depleted (i.e., the bi-propellants are depleted at or around the same time). This proportional depletion reduces the amount of extra propellant to be carried by a rocket. Therefore, a payload mass carried by the rocket can be increased. The systems and methods then need to more accurately determine propellant volumes and commanded flow rate biases.

A bi-propellant propulsion system of a rocket generates thrust by feeding an oxidizer and a fuel into the combustion chamber at a chosen mixture ratio, which produces maximum performance within structural and thermal constraints. Thrust is produced by expanding combustion products through a nozzle.

A mixture ratio is defined as the ratio of liquid oxidizer mass flow rate to liquid fuel mass flow rate. A controller determines the remaining volumes of each of the liquid propellants and adjusts the mixture ratio based on the remaining volumes of each of the liquid propellants, a volumetric flow rate bias, and a defined new volume ratio. The volume of each propellant can be determined based on ambient environmental data, such as data measured or sensed by a sensor within each respective propellant tank. Volumetric flow rate can be determined by any appropriate method, including change in volume over change in time. The volumetric flow rate bias, which is the difference between commanded flow rate and observed flow rate, can be estimated (such as with a Kalman filter), then corrected by the controller.

The controller can calculate an adjusted mixture ratio and command the rocket engine to implement the adjusted mixture ratio by opening or closing flow control valves between each of the propellant tanks and the rocket engine. The opening and closing of valves change the volumetric flow rate of each of the liquid propellants. The adjusted mixture ratio can be used to evenly deplete the propellants. Even propellant depletion reduces the amount of each propellant remaining after a mission and improves propellant use, which allows for an increase in a non-propellant payload. The adjusted mixture ratio can be calculated by an algorithm based on sensed or calculated data associated with each propellant, including an amount of propellant, volumetric flow rate, volumetric flow rate bias, old propellant mixture ratio, or combinations thereof.

FIG. 1 shows an example rocket engine propulsion system 100. FIG. 1 shows propellants flowing from an oxidizer tank and fuel tank through respective turbopumps and a gas generator. However, the disclosure can be used in other variations of rocket engine cycles that cause the oxidizer and fuel to flow into a combustion chamber, and the disclosed variation is not limiting in any way to the disclosed propellant volume and mixture ratio control systems to observe and correct volumetric flow rates from the oxidizer and fuel tanks.

The rocket engine propulsion system 100 generates thrust by expelling exhaust generated by concurrent combustion of two propellants.

The rocket engine propulsion system 100 includes an oxidizer tank 102 to store an oxidizer and a fuel tank 104 to store a fuel. In this example, oxidizer is fed to a combustion chamber 132 via an oxidizer turbopump 112. The way in which the oxidizer or fuel is fed to the combustion chamber can forego a turbopump in other configurations. The fuel is fed to the combustion chamber via a fuel turbopump 114. As mentioned above, the disclosed propellant volume and mixture ratio control systems can be used with other variations of rocket engines.

The combustion chamber 132 is a vessel that receives the oxidizer and fuel and in which the oxidizer and fuel undergo combustion to produce exhaust. The exhaust is passed through a nozzle 134 to increase exhaust flow and produce thrust.

In the example shown in FIG. 1, the rocket engine propulsion system 100 also includes a gas generator 120 that produces high-pressure gas or steam used to power a turbine of a rotor of the oxidizer turbopump 112. Alternative designs use a tap-off cycle to produce the power for the turbopumps. The high-pressure gas or steam drives the turbine of the rotor, which causes the entire rotor to spin or rotate. The gas can be generated by burning some of the liquid propellant (e.g., oxidizer, fuel, or both) within the gas generator 120. The high-pressure gas or steam can also be used to power a turbine of a rotor of the fuel turbopump 114 in some examples. Alternatively, the disclosed propellant volume and mixture ratio control systems can be used with engines that use a tap-off cycle to produce the power for the turbopumps or another power source for the turbopumps instead of a generator, as shown in FIG. 1.

FIG. 2A shows the oxidizer tank 102. FIG. 2B shows a cross-section of the oxidizer tank 102 taken along the line I-I. The oxidizer tank 102 includes a sidewall 210 forming a cavity 212 to hold an oxidizer 214. The oxidizer 214 can be liquid oxygen, liquid fluorine, nitric acid, nitrogen tetroxide, or the like.

The oxidizer tank 102 can also include a liquid level sensor 216. The liquid level sensor 216 can transmit a signal to a controller or processor to determine a level or height 220 of the oxidizer 214 stored within the oxidizer tank 102. The level or height 220 of the oxidizer 214 can be an absolute height (e.g., a top surface of the oxidizer 214 is a given height within the oxidizer tank 102) or a relative height (e.g., the top surface of the oxidizer 214 within the oxidizer tank 102 is a given height above a reference point).

The liquid level sensor 216 can be a rake sensor, a point level measurement sensor, a continuous level transmitter, a reflective level sensor, an ultrasonic level sensor, a flowline level sensor, a submersible sensor, a float level sensor, a vibration fork level, a proximity sensor, a resistance temperature detector, a delta-pressure transducer, or the like, or combinations or multiples thereof. Also, one or more video image processing sensors can be included to help determine the liquid level. Video image processing could additionally be used to help provide measurements of the dynamic variations in the tank level due to slosh and acceleration. The liquid level sensor 216 can be located within the cavity 212 or embedded within the sidewall 210.

FIG. 3A shows the fuel tank 104. FIG. 3B shows a cross-section of the fuel tank 104 taken along the line II-II. The fuel tank 104 includes a sidewall 310 forming a cavity 312 to hold a fuel 314. The fuel 314 can be liquid hydrogen, liquid natural gas (LNG), liquid methane, kerosene, alcohol, hydrazine, RP-1, or the like.

The fuel tank 104 can also include a liquid level sensor 316. The liquid level sensor 316 can transmit a signal to a controller or processor to determine a level or height 320 of the fuel 314 stored within the fuel tank 104. The level or height 320 of the fuel 314 can be an absolute height (e.g., a top surface of the fuel 314 is 4 feet high within the fuel tank 104) or a relative height (e.g., the top surface of the fuel 314 within the fuel tank 104 is 6 inches above a given component or pre-set level).

The liquid level sensor 316 can be a rake sensor, a point level measurement sensor, a continuous level transmitter, a reflective level sensor, an ultrasonic level sensor, a flowline level sensor, a submersible sensor, a float level sensor, a vibration fork level, a proximity sensor, a resistance temperature detector, or the like, or combinations or multiples thereof. As with the oxidizer tank 102, one or more video image processing sensors can be included to help determine the liquid level. Video image processing could additionally be used to help provide measurements of the dynamic variations in the tank level due to slosh and acceleration. The liquid level sensor 316 can be located within the cavity 312 or embedded within the sidewall 310.

Figure 4:
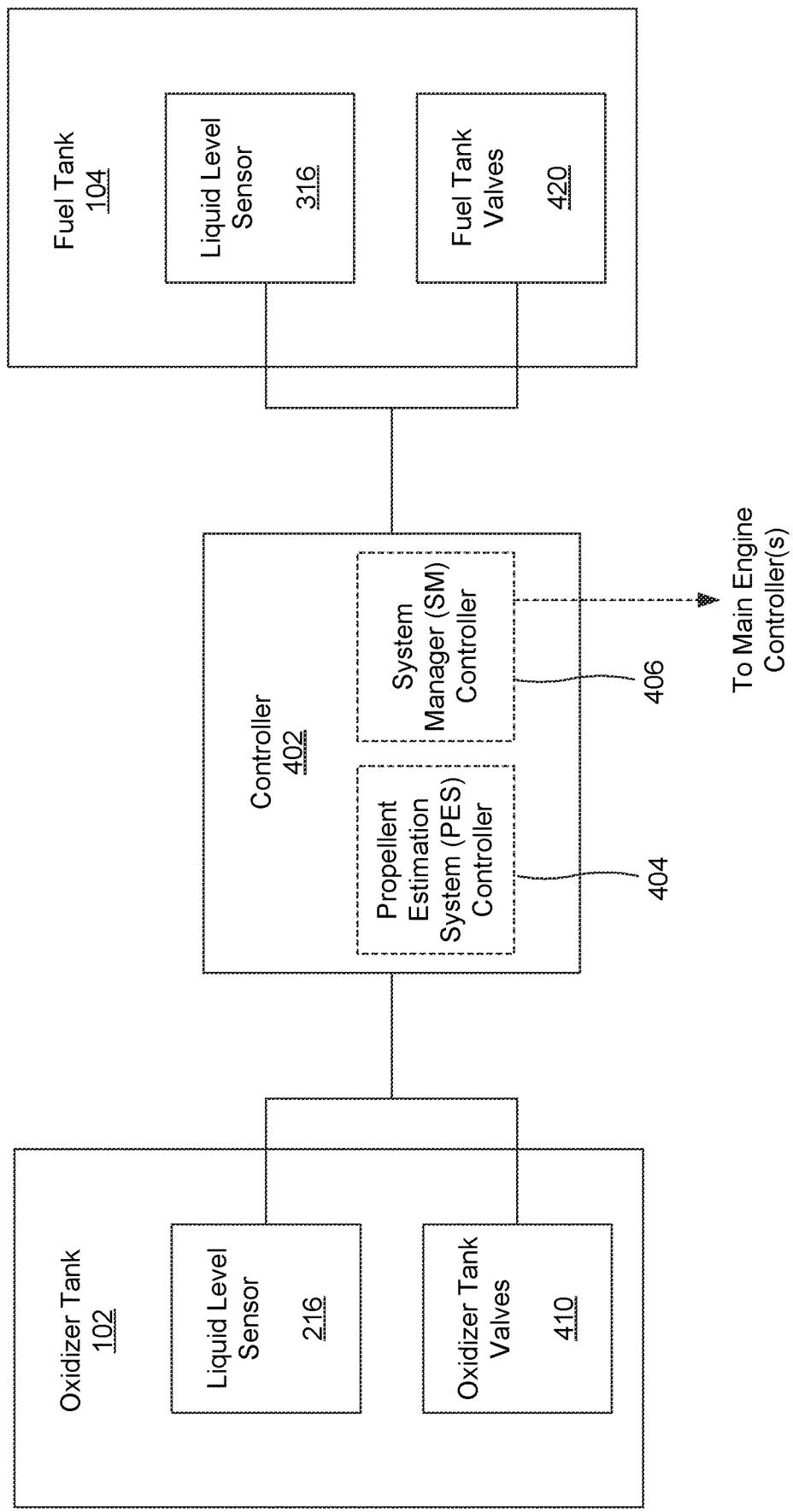
FIG. 4 illustrates a block diagram of an example control system.

FIG. 4 shows a block diagram of a control system 400. The control system 400 includes a controller 402 in communication with the liquid level sensor 216 and oxidizer tank valves 410 of the oxidizer tank 102. The controller 402 is also in communication with the liquid level sensor 316 and fuel tank valves 420 of the fuel tank 104. The controller 402 can communicate with the liquid level sensor 216, the oxidizer tank valves 410, the liquid level sensor 316, and the fuel tank valves 420 via a wired connection or a wireless connection. The wireless connection can be near field communication, ZigBee®, Bluetooth®, WiFi, or the like.

In this example, shown in FIG. 4, the controller 402 is shown as a single block for simplicity. The controller can include multiple distributed controllers or portions of a single controller can be dedicated to certain functions or routines of the overall system. For example, the controller could have a propellant estimation system (PES) controller 404 and a system manager (SM) controller 406. The PES controller 404 processes the data from the liquid level sensors 216, 316, and the SM controller 406 modulates the oxidizer tank and fuel tank valves 410, 420. The liquid level sensors 216, 316 shown in FIG. 4 can also be a set of pressure sensors and overdriven RTD sensors in some examples. The PES controller 404 determines an estimate of the propellant levels in the oxidizer tank 102 and the fuel tank 104 based on the data it receives from the liquid level sensors 216, 316 in each respective tank. Based on the estimated propellent levels for each tank that it receives from the PES controller 404, the SM controller 406 generates an instruction for a third set of controllers to increase or decrease the oxidizer to fuel ratio. This third set of controllers (not shown) can be a main engine controller—each engine in the system can be controlled by a respective main engine controller in multi-engine systems. These main engine controller(s) modulate the propellant valves in a way that maintains the thrust of the engine while modifying the oxidizer to fuel mixture ratio.

The controller 402 can process signals received from the liquid level sensors 216, 316 to determine the heights of the oxidizer and the fuel within the oxidizer tank 102 and the fuel tank 104, respectively. The controller 402 can transmit signals, which include instructions or commands, to cause the oxidizer tank valves 410 and the fuel tank valves 420 to open and close. Opening and closing the oxidizer tank valves 410 and the fuel tank valves 420 can adjust or regulate the amount of the oxidizer 214 and the amount of the fuel 314 that flows to the combustion chamber 132 from the oxidizer tank 102 and the fuel tank 104, respectively. Adjusting or regulating the amount of the oxidizer 214 and the amount of the fuel 314 that flows to the combustion chamber 132 can also adjust or regulate the mixture ratio (e.g., ratio of oxidizer to fuel).

The liquid level sensors 216, 316 can output signals continuously, when tripped (e.g., wet-dry transitions or RTD temperature change), at given time intervals (e.g., every X seconds, minutes, or hours, where X is 1 or more), manually (i.e., when requested by the controller 402 or an operator), at pre-determined times (e.g., pre-determined times after launch, pre-determined times when the rocket reaches a given altitude, or the like), when low or zero gravity is reached as determined by a sensor or an anticipated time based on previous launches, or the like.

The oxidizer tank valves 410 and the fuel tank valves 420 can be solenoid valves, diaphragm valves, check valves, ball valves, linear poppet valves, gate valves, the like, or combinations or multiples thereof. For example, the oxidizer tank valve(s) 410 is a ball valve and the fuel tank valve(s) 420 is a linear poppet valve. The oxidizer tank 102 and the fuel tank 104 can each include any appropriate number of valves, including, 1, 2, 3, or more. Valve configuration (i.e., open or closed) and the number of valves can be used to regulate or adjust volumetric flow rate (i.e., release of the propellant from the propellant tank). For example, two valves completely open can provide a greater flow rate than one valve completely open and one valve completely closed.

Figure 5:
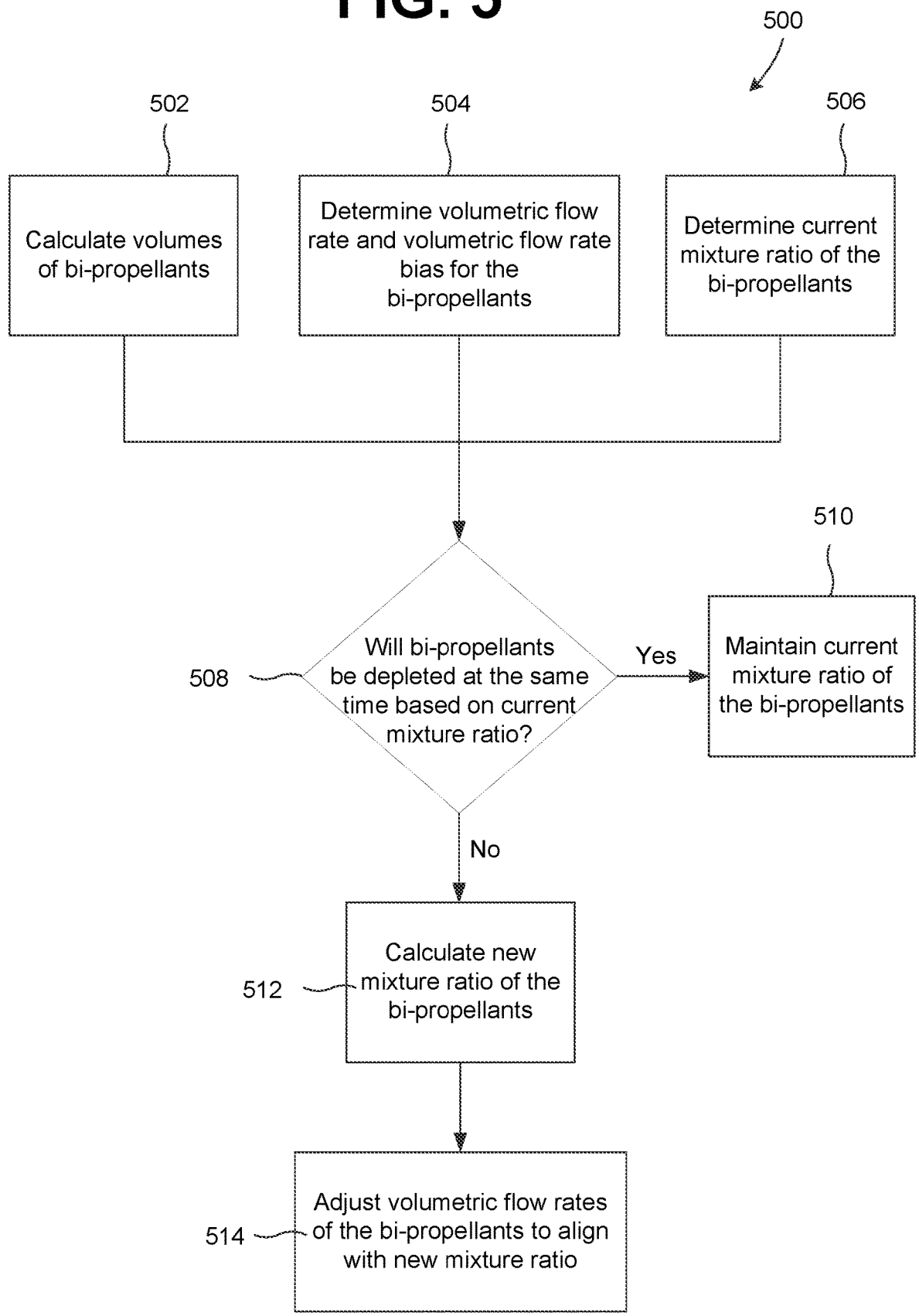
FIG. 5 illustrates a flowchart of an example method for adjusting a mixture ratio of propellants.

FIG. 5 shows a flowchart for a method 500 of adjusting a mixture ratio. The propellant estimation system (PES) and mixture ratio (MR) control algorithms can calculate and cancel volume flow rate command bias. The PES and MR control algorithms can also correct an accumulated volume imbalance by regulating propellant volume ratios. Accurate MR control can minimize the amount of flight performance reserve (FPR) that needs to be carried on each mission to meet fuel and oxidizer allocations. FPR is an extra amount of fuel, oxidizer, or fuel and oxidizer compared to the amount of fuel or oxidizer that is necessary to reach a desired orbit or altitude.

The PES and MR includes propellant height and volumetric flow rate command bias. The controller cancels the calculated volumetric flow rate command bias and applies proportional control to drive a normalized propellant volume ratio to 1. This allows the disclosed systems to regulate propellant volume ratios instead of using the conventional methods that regulate to propellant mass ratios. The disclosed systems can regulate propellant volume ratios when uncertainty is introduced into one or more parameters, including in propellant flow rates and the propellant height (or an equivalent volume). Measurements can be uncertain due to asynchronicity (i.e., when the measurement is taken relative to and apart in time from when a value using that measurement is calculated), movement of propellants within the tanks (i.e., sloshing), or the like. This uncertainty can introduce errors into the calculations. The disclosed systems can remove uncertainty by proportionally accounting for uncertainty of the parameters used in the calculations. This removes uncertainty from the parameters, such that the uncertainties are mathematically removed from the values of the parameters used in the calculations. For example, determining the propellant flow rates and the propellant height (or an equivalent volume) with respect to a tank map (i.e., shape, size, or configuration of the respective propellant tanks) can introduce the uncertainty. The uncertainty can be removed by comparing initial propellant volumes to instantaneous propellants volumes. Each volume calculation includes uncertainty. The ratios can mathematically remove the uncertainties since the uncertainties are common factors, which cancel each other out.

Propellant estimation is formulated in terms of volume as measured by propellant height and the tank map(s). The states being estimated for each tank are fluid height and volumetric flow rate command bias. Fluid height is the height of the propellant within the propellant tank. Volumetric flow rate is a volume of fluid that flows past a certain point in the system over a given amount of time. Volumetric flow rate bias is the difference between the volumetric flow rate being commanded and the flow rate that is observed via height measurements over time.

At 502, the volume of each bi-propellant (e.g., the oxidizer and the fuel) is calculated. To calculate the volumes of the bi-propellant, the heights of each bi-propellant within their respective tanks is determined. The height of the oxidizer can be determined by a liquid level sensor within the oxidizer tank. The signal generated by the liquid level sensor of the oxidizer tank is sent to the controller. The controller can process the signal to determine the height of the oxidizer within the oxidizer tank. The height of the fuel can be determined by a liquid level sensor within the fuel tank. The signal generated by the liquid level sensor of the fuel tank is sent to the controller. The controller can process the signal to determine the height of the fuel within the fuel tank.

In one example, such as with a rake sensor, a wet-dry transition can be used to determine the heights of the propellants within their respective tanks. The wet-dry transition is a point or location on the rake sensor where a dry portion transitions into a wet portion. To account for portions of the rake sensor being wet because of propellant movement rather than propellant height reaching that level (e.g., due to sloshing), the wet-dry transition can require two or more consecutive or adjacent points along the rake sensor to be wet. Otherwise, during sloshing or propellant movement due to acceleration, a portion of the rank sensor not properly associated with the height of the propellant can be tripped and the signal transmitted to the controller can improperly denote propellant height. By accounting for propellant movement, such as by requiring two or more consecutive points to be wet, any instantaneous changes in propellant height can be filtered out. Therefore, the point at which the wet-dry transition occurs is determined to be the height of the propellant.

In another example, such as with resistance temperature detectors (RTDs), a temperature transition can be used to determine the heights of the propellants within their respective tanks. The temperature transition is similar to the wet-dry transition except that two consecutive or adjacent RTDs have the same temperature with the one above those two RTDs having a different temperature. Again, this can filter out instantaneous changes in propellant height that would improperly trip certain RTDs or provide a signal directed to an improper height caused by propellant movement.

Volume can be expressed as a generalized function of tank height: V=f(h).). For example, once the heights of the propellants are determined, those heights can be added to a volume equation based on the shapes of the oxidizer and fuel tanks. If the oxidizer and fuel tanks are a common fuel shape of cylinders with known radii, then the volumes of the oxidizer and the fuel can be determined by the equation:

$$V=\pi r^2 h$$

where h is the height of the oxidizer or the height of the fuel. The oxidizer tank and the fuel tank, however, are not limited in shape to a cylinder. The oxidizer and fuel tanks can be any appropriate shape or configuration, including, ovals, cubes, or the like.

At 504, the volumetric flow rate and the volumetric flow rate bias for each of the oxidizer and the fuel are determined. To determine volumetric flow rates, changes in volumes for the oxidizer and the fuel are determined over a given time period or amount of time.

The fluid height and the volumetric flow rate bias are asynchronous height measurements (i.e., the fluid height is taken at a first time and the volumetric flow rate bias is calculated a second time using the fluid height measured at the first time). To determine the volumetric flow rate bias, the commanded volumetric flow rate (i.e., the volumetric flow rate that the controller commands based on the opening and closing of the tank valves) can be subtracted from the observed volumetric flow rate (i.e., the actual volumetric flow rate as determined by observation or calculation). Or, the observed volumetric flow rate can be subtracted from the commanded volumetric flow rate.

Alternatively, a Kalman filter can be used to determine the volumetric flow rate bias. The Kalman filter, or a linear quadratic estimator, is an algorithm that uses a series of measurements observed over time to produce estimates of unknown variables. The measurements over time can include statistical noise or inaccuracies. The estimates of the unknown variables can be more accurate than those based on single measurements by estimating a joint probability distribution over the variables for each timeframe. The algorithm is recursive (i.e., a method of solving a problem where the solution depends on solutions to smaller instances of the same problem), can run in real time and does not need past information.

When using a Kalman filter state $[dV\ h]^T$, where dV is the volumetric flow rate command bias state, and where h is the propellant height in the tank with discrete time variable, k, the estimator discrete state-space equations are given by $$\begin{bmatrix} dV \\ h \end{bmatrix}_k = \begin{bmatrix} 1 & 0 \\ \frac{\Delta t}{A(h_{k-1})} & 1 \end{bmatrix} \begin{bmatrix} dV \\ h \end{bmatrix}_{k-1} + \Delta t \begin{bmatrix} 0 \\ \frac{1}{A(h_{k-1})} \end{bmatrix} [v_{cmd,k-1}] + q_{k-1}$$

where A(h) is the cross-sectional tank area from the tank map, $\Delta t=0.01$ seconds is the time step, and $q_k$ is process noise from a zero mean Gaussian with covariance $Q_k$.

The dV bias state provides integral action in the control scheme by integrating to estimate the differences between commanded and observed volumetric flow rates.

The measurement, $y_k$, is measured height as described by $$y_k = \begin{cases} [0\ 1]\begin{bmatrix} dV \\ h \end{bmatrix}_k + r_k & \text{sensor - based measurement available} \\ \emptyset & \text{no measurement available} \end{cases}$$

where $r_k$ is measurement noise from a zero mean Gaussian with covariance $R_k$. The discrete dynamics equation along with the measurement equation fully determines the Kalman filter for a system.

Good performance of the Kalman filter relies on the dynamics model and the measurement model being sufficiently accurate such that properly tuned process noise and measurement noise magnitudes are small. The measurement noise has been determined by analyzing the accuracy loss due to slosh and wet-to-dry transition delay. Accordingly, the process noise matrix $Q_k$ depends on one parameter only. To determine a good value of this parameter, Monte Carlo simulations can be performed over a sweep of values and the value resulting in the best estimation performance can be chosen.

At 506, the current MR is determined. MR is the ratio of oxidizer flow rate (e.g., mass or volumetric) to fuel flow rate (e.g., mass or volumetric) consumed by the propulsion system in producing thrust. In one example, the MR can be the ratio of the commanded flow rates for the oxidizer and the fuel. In another example, the MR can be the ration of the observed flow rates for the oxidizer and the fuel.

At 508, the controller determines whether the oxidizer and the fuel will be depleted at the same time (i.e., concurrently) based on the current mixture ratio, the current volumes of the oxidizer and the fuel, and the observed volumetric flow rate including the volumetric flow rate bias.

At 510, if the bi-propellants will be depleted at the same time, then the current MR can be maintained.

The same time for depletion is a time at which both propellants are depleted (i.e., propellants are depleted concurrently). For example, at time t=1, both propellants are depleted. The difference in depletion rates of the propellants can be milliseconds, seconds, or minutes.

At 512, if the bi-propellants will run out at different times (i.e., the oxidizer and fuel are being depleted disproportionately relative to their respective volumes), then a new MR is calculated. At 514, the volumetric flow rates of the oxidizer and the fuel are adjusted to align with the new MR by instructing or commanding the valves of the propellants tanks to open and close to obtain the determined volumetric flow rates. The adjusted volumetric flow rates cause the oxidizer and fuel to be depleted at the same time (i.e., concurrently).

To control MR, volume ratios are regulated as a proxy for MR since volume is directly measured while mass is not because of the propellant density uncertainty. By regulating volume ratios instead of approximate mass ratios, the propulsion system can consume propellants such that both oxidizer and fuel tanks would run empty at the same moment.

MR control is implemented in three parts including volume flow rate command bias cancellation, volume imbalance correction, and volume flow rate correction. The volumetric flow rate command bias is canceled by subtracting the estimated bias from the command issued to the engines. A proportional scheme can be used to regulate volume ratios to eliminate accumulated volume imbalance. The error signal for proportional control is created by defining a normalized ratio ($\mu$) as follows:

$$\mu = \frac{V_{ox}/V_{ox_0}}{V_{fuel}/V_{fuel_0}}$$

To reach the proportional control of the error signal, the same ratio of oxidizer to fuel should be maintained throughout a mission. The ratio of the oxidizer to fuel volume equals the initial ratio of oxidizer to fuel as follows:

$$\frac{V_{ox_t}}{V_{fuel_t}} = \frac{V_{ox_0}}{V_{fuel_0}}$$

The normalized ratio ($\mu$) becomes:

$$\mu = \frac{V_{ox_t}/V_{fuel_t}}{V_{ox_0}/V_{fuel_0}}$$

Which then becomes:

$$\mu = \frac{V_{ox_t}/V_{ox_0}}{V_{fuel_t}/V_{fuel_0}}$$

The novel control scheme seeks to drive the normalized ratio ($\mu$) to 1. When $\mu$ equals 1, the propellants deplete at the same instant in time. The normalized ($\mu$) ratio is defined as the ratio of oxidizer volume to initial oxidizer volume divided by the ratio of fuel volume to initial fuel volume, as described in the above equations.

Regulating $\mu$ to 1 requires that the volume ratios remain equal to the initial volume ratio throughout a rocket mission. A proportional gain, $K_\mu$, is applied to the error signal ($\mu-1$) to compute a MR control adjustment to drive the error to zero.

The true mass flow rate consumed by the engines is calibrated during engine testing, but can have some drift from nominal. If the mass flow rate is high or low, but in the correct ratio of oxidizer to fuel, then no corrections are made to MR command. With this, the complete MR control command issued to the engines, $MR_{eng}$, is computed as follows:

$$MR_{eng} = \frac{\bar{\rho}_{ox}[V_{cmd_{ox}} - dV_{ox}]}{\bar{\rho}_{fuel}[V_{cmd_{fuel}} - dV_{fuel}]}$$

where $\bar{\rho}_{ox}$ and $\bar{\rho}_{fuel}$ are the average approximate values of propellant densities, $dV_{ox}$ and $dV_{fuel}$ are the estimated volumetric flow rate command biases, and the biased volumetric flow rate commands, ($V_{cmd_{ox}}$, $V_{cmd_{fuel}}$), are computed from the following two equations $$V_{cmd_{ox}} = \frac{1}{\bar{\rho}_{ox}}\left(\frac{MR_{cmd}}{1+MR_{cmd}}\right)(\dot{m}_{thrust} + \dot{m}_{corr}); \text{ and}$$

$$V_{cmd_{fuel}} = \frac{1}{\bar{\rho}_{fuel}}\left(\frac{1}{1+MR_{cmd}}\right)(\dot{m}_{thrust} + \dot{m}_{corr})$$

where $\dot{m}_{thrust}$ is the open-loop mass flow rate corresponding to the current thrust command to the engines, and the mass flow rate correction, $\dot{m}_{corr}$, is given by:

$$\dot{m}_{corr} = dV_{ox}\cdot\rho_{ox} + dV_{fuel}\cdot\rho_{fuel}$$

The mass-imbalance-corrected MR command, $MR_{cmd}$, is computed from the reference MR setpoint, $MR_{ref}$ (e.g., 3.2), and the proportional control command:

$$MR_{cmd} = MR_{ref} + K\mu\cdot(\mu-1)$$

Though a bi-propellant engine is discussed herein, the disclosure is not intended to be so limited. The disclosed systems and methods can be applied to any engine using multiple propellants (e.g., bi-propellant, tri-propellant, or the like). Though a rocket is discussed herein, the disclosure is not intended to be so limited. The disclosed systems and methods can be applied to any vehicle or system using multiple propellants (e.g., space craft, aircraft, missiles, jet engines, projectiles, or the like).

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A method for depleting bi-propellants of a rocket engine propulsion system, the method comprising:
   measuring, at a first time, respective first-measured volumes of a first propellant within a first propellant tank and a second propellant within a second propellant tank;
   measuring, at a second time, respective second-measured volumes of the first propellant within the first propellant tank and the second propellant within the second propellant tank;

based on a comparison between the first-measured volumes and the second-measured volumes, determining respective current volumetric flow rates of the first propellant and the second propellant that are each being pumped to a combustion chamber;

determining an adjusted mixture ratio to concurrently deplete the first propellant and the second propellant, the adjusted mixture ratio being based on the volumetric flow rates of the first propellant and the second propellant; and adjusting the volumetric flow rate of the first propellant by outputting a signal to cause the first propellant tank to release the first propellant at an adjusted volumetric flow rate based on the adjusted mixture ratio.

2. The method of claim 1, further comprising adjusting the volumetric flow rate of the second propellant by outputting a signal to the second propellant tank, the signal causing valves of the second propellant tank to release the second propellant at an adjusted volumetric flow rate based on the adjusted mixture ratio.

3. The method of claim 2, wherein the first propellant is an oxidizer and the second propellant is a fuel.

4. The method of claim 2, wherein the first propellant is a fuel and the second propellant is an oxidizer.

5. The method of claim 1, further comprising receiving a signal from a sensor in the first propellant tank, the signal being associated with a height of the first propellant within the first propellant tank.

6. The method of claim 5, wherein the sensor in the first propellant tank determines the height of the first propellant based on a wet-dry transition including a first location on the sensor is dry and two adjacent locations on the sensor are wet.

7. The method of claim 5, wherein the first-measured volume and the second-measured volume of the first propellant is determined based on the height of the first propellant at the first time and at the second time, respectively, and a tank map of the first propellant tank.

8. The method of claim 7, further comprising receiving a signal from a sensor in the second propellant tank, the signal being associated with a height of the second propellant within the second propellant tank.

9. The method of claim 8, wherein the sensor in the second propellant tank determines the height of the second propellant based on a wet-dry transition including a first location on the sensor is dry and two adjacent locations on the sensor are wet.

10. The method of claim 8, wherein the first-measured volume and the second-measured volume of the second propellant is determined based on the height of the second propellant at the first time and at the second time, respectively, and a tank map of the second propellant tank.

11. The method of claim 1, further comprising determining volumetric flow rate biases for the first and second propellants, the volumetric flow rate biases based on differences between a commanded volumetric flow rate and an observed volumetric flow rate for each of the first and second propellants.

12. The method of claim 11, wherein the current volumetric flow rates of the first and second propellants are associated with the volumetric rate biases of the first and second propellants, respectively.

13. The method of claim 11, wherein the volumetric flow rate biases are determined by a Kalman filter.

14. A system for depleting bi-propellants of a rocket engine propulsion system at a same time, the system comprising:
a first propellant tank including a first propellant;
a second propellant tank including a second propellant; and
a controller configured to:
measure, at a first time, respective first-measured volumes of the first propellant within the first propellant tank and the second propellant within the second propellant tank;
measure, at a second time, respective second-measured volumes of the first propellant within the first propellant tank and the second propellant within the second propellant tank;
based on a comparison between the first-measured volumes and the second-measured volumes, determine current volumetric flow rates of the first propellant and the second propellant being pumped to a combustion chamber;
determine an adjusted mixture ratio to deplete the first propellant and the second propellant at a same time, the adjusted mixture ratio being based on the volumetric flow rates of the first propellant and the second propellant; and
output a signal to the first propellant tank to cause the first propellant tank to release the first propellant at an adjusted volumetric flow rate based on the adjusted mixture ratio.

15. The system of claim 14, further comprising:
a sensor in the first propellant tank, the sensor configured to generate a signal associated with a height of the first propellant within the first propellant tank; and
a sensor in the second propellant tank, the sensor configured to generate a signal associated with a height of the second propellant within the second propellant tank.

16. The system of claim 14, wherein the first propellant tank further comprises valves to release the first propellant at the adjusted volumetric flow rate of the first propellant.

17. The system of claim 14, wherein the controller is further configured to output a signal to the second propellant tank to cause the second propellant tank to release the second propellant at an adjusted volumetric flow rate based on the adjusted mixture ratio.

18. The system of claim 17, wherein the first propellant tank further comprises valves to release the first propellant at the adjusted volumetric flow rate of the first propellant in response to the signal output to the first propellant tank, and wherein the second propellant tank further comprises valves to release the second propellant at the adjusted volumetric flow rate of the second propellant in response to the signal output to the second propellant tank.

19. The system of claim 14, wherein the controller is further configured to determine volumetric flow rate biases for the first and second propellants, the volumetric flow rate biases based on differences between a commanded volumetric flow rate and an observed volumetric flow rate for each of the first and second propellants, and the current volumetric flow rates of the first and second propellants being associated with the volumetric rate biases of the first and second propellants, respectively.

20. The system of claim 14, wherein the first propellant is an oxidizer and the second propellant is a fuel.

* * * * *